US012319203B2

(12) United States Patent
Hidaka

(10) Patent No.: US 12,319,203 B2
(45) Date of Patent: Jun. 3, 2025

(54) VEHICLE-MOUNTED DEVICE-FIXING STRUCTURE

(71) Applicant: TOYOTA JIDOSHA KABUSHIKI KAISHA, Toyota (JP)

(72) Inventor: Makoto Hidaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 78 days.

(21) Appl. No.: 18/342,989

(22) Filed: Jun. 28, 2023

(65) Prior Publication Data

US 2024/0067101 A1    Feb. 29, 2024

(30) Foreign Application Priority Data

Aug. 26, 2022   (JP) .................................. 2022-134849

(51) Int. Cl.
*B60R 11/00* (2006.01)
*B60R 16/033* (2006.01)

(52) U.S. Cl.
CPC ............ *B60R 11/00* (2013.01); *B60R 16/033* (2013.01)

(58) Field of Classification Search
CPC .............................. B60R 11/00; B60R 16/033
See application file for complete search history.

(56) References Cited

U.S. PATENT DOCUMENTS

| | | | | |
|---|---|---|---|---|
| 6,076,877 A * | 6/2000 | Krieg | ...................... | B60R 11/02 296/204 |
| 7,230,404 B2 * | 6/2007 | Kimoto | ............... | H01M 10/658 320/150 |
| 7,513,550 B1 * | 4/2009 | Abro | ......................... | B60R 7/04 296/24.34 |
| 7,735,785 B2 * | 6/2010 | Wippler | .............. | B60R 11/0205 248/27.1 |
| 9,145,174 B2 * | 9/2015 | Iwano | .................. | B62D 25/163 |
| 9,365,165 B2 * | 6/2016 | Koyama | .............. | H05K 5/0073 |
| 9,902,334 B2 * | 2/2018 | Ando | ..................... | B60R 11/00 |
| 10,286,775 B2 * | 5/2019 | Kiya | ................... | H01M 50/204 |
| 11,312,233 B2 * | 4/2022 | Otoguro | .............. | H05K 5/0026 |
| 11,420,509 B2 * | 8/2022 | Saeki | ..................... | B60N 2/015 |
| 12,115,948 B2 * | 10/2024 | Hamilton | ............. | G01S 7/4813 |
| 2014/0014794 A1 | 1/2014 | Koyama et al. | | |
| 2015/0283955 A1 * | 10/2015 | Sakamoto | ............ | F16B 5/0258 248/636 |

FOREIGN PATENT DOCUMENTS

| | | |
|---|---|---|
| JP | 2004-253314 A | 9/2004 |
| JP | 6035926 B2 | 11/2016 |
| JP | 2020-032934 A | 3/2020 |

* cited by examiner

*Primary Examiner* — Eret C McNichols
(74) *Attorney, Agent, or Firm* — Sughrue Mion, PLLC

(57) ABSTRACT

The vehicle-mounted device-fixing structure includes a vehicle-mounted device, a first bracket that is fixed to the vehicle-mounted device, and a second bracket that is fixed to the vehicle-mounted device. The first bracket has a first fastening member that is fastened to a first fastening surface provided on a vehicle. The second bracket has a second fastening member that is fastened to a second fastening surface provided on the vehicle. The first fastening member includes a first contact surface that contacts the first fastening surface, and the second fastening member includes a second contact surface that contacts the second fastening surface. An angle formed between the first contact surface and the second contact surface is an obtuse angle.

4 Claims, 4 Drawing Sheets

VEHICLE-MOUNTED DEVICE-FIXING STRUCTURE

CROSS REFERENCE TO RELATED APPLICATIONS

This non-provisional application is based on Japanese Patent Application No. 2022-134849 filed on Aug. 26, 2022 with the Japan Patent Office, the entire contents of which are hereby incorporated by reference.

BACKGROUND

Field

The present disclosure relates to a vehicle-mounted device-fixing structure.

Description of the Background Art

Japanese Patent No. 6035926 discloses a vehicle-mounted device-fixing structure that includes a vehicle-mounted device such as a control unit, a first bracket which fixes the vehicle-mounted device to a floor panel, and a second bracket which fixes the vehicle-mounted device to a cross member. One end of the first bracket is fixed to a front surface of the vehicle-mounted device, and is configured to extend forward from the vehicle-mounted device. The second bracket includes a mounting member that is fixed to a rear surface of the vehicle-mounted device, a mounting member that is fixed to the cross member, and a joining member that joins the two mounting members to each other. The joining member is configured to extend in the longitudinal direction of the vehicle.

SUMMARY

In the vehicle-mounted device-fixing structure described in Japanese Patent No. 6035926, the outer dimension of the structure including the vehicle-mounted device and each bracket is large in planar view.

The purpose of the present disclosure is to provide a vehicle-mounted device-fixing structure with a reduced outer dimension in planar view.

According to an aspect of the present disclosure, a vehicle-mounted device-fixing structure includes: a vehicle-mounted device that is mounted on a vehicle; a first bracket that is fixed to the vehicle-mounted device; and a second bracket that is fixed to the vehicle-mounted device. The first bracket includes a first fastening member that is fastened to a first fastening surface provided on the vehicle, the second bracket includes a second fastening member that is fastened to a second fastening surface provided on the vehicle, the first fastening member includes a first contact surface that contacts the first fastening surface, the second fastening member includes a second contact surface that contacts the second fastening surface, and an angle formed between the first contact surface and the second contact surface is an obtuse angle.

The foregoing and other objects, features, aspects and advantages of the present disclosure will become more apparent from the following detailed description of the present invention when taken in conjunction with the accompanying drawings.

DESCRIPTION OF THE PREFERRED EMBODIMENTS

Figure 1:
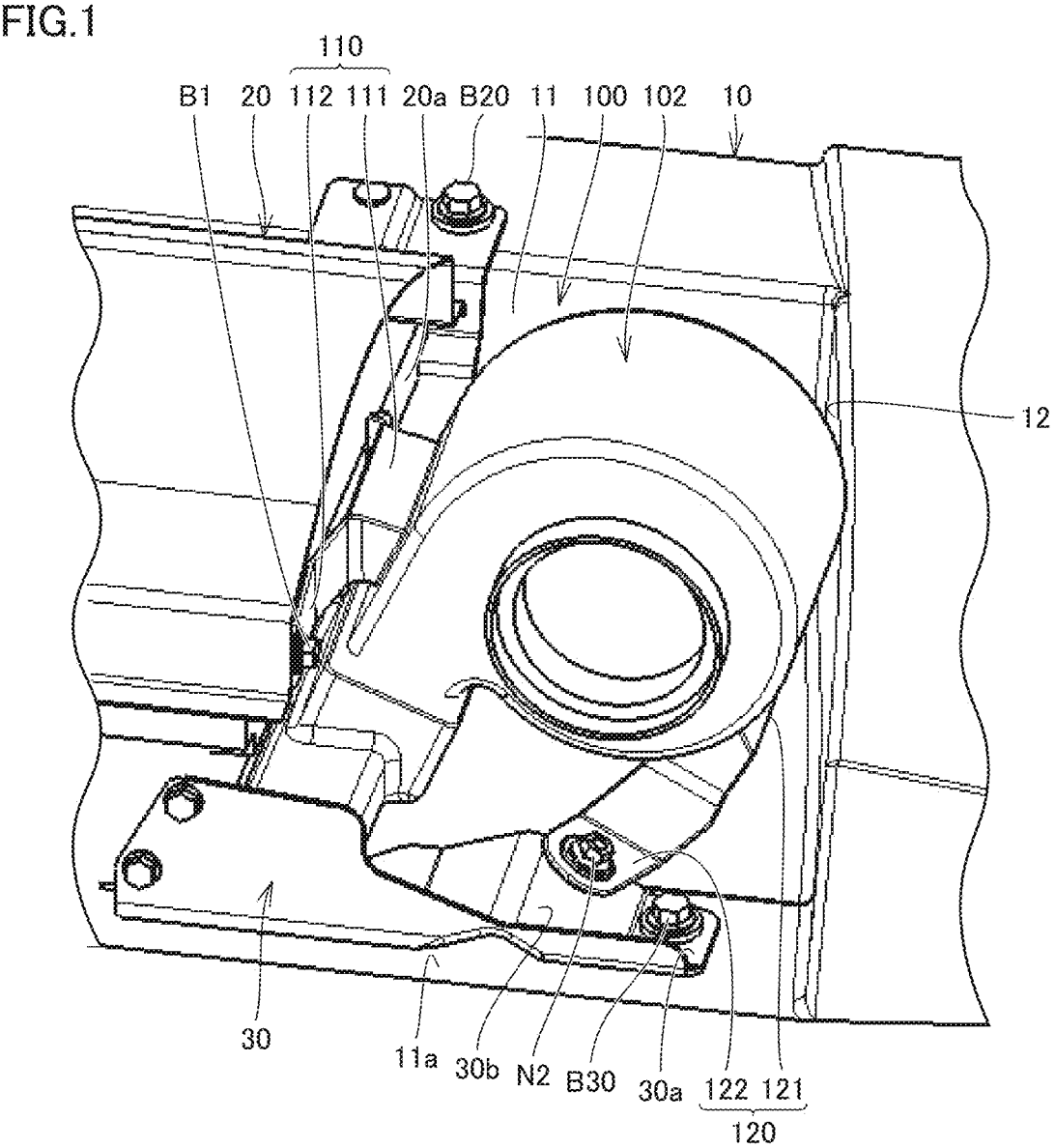
FIG. 1 is a perspective view schematically illustrating a vehicle-mounted device-fixing structure according to an embodiment of the present disclosure.

Embodiments of the present disclosure will be described with reference to the drawings. In the drawings, the same or equivalent members are denoted by the same reference numerals.

FIG. 1 is a perspective view schematically illustrating a vehicle-mounted device-fixing structure 100 according to an embodiment of the present disclosure. The vehicle-mounted device-fixing structure 100 is preferably applied to a vehicle (such as a hybrid vehicle or the like) equipped with a battery pack 20 that includes a plurality of storage cells.

As illustrated in FIG. 1, a vehicle body 10 is provided with a housing 11 for housing the battery pack 20 and a vehicle-mounted device 102. The battery pack 20 has a side surface 20a, and the housing 11 has an opposing wall 12 opposed to the side surface 20a.

Figure 2:
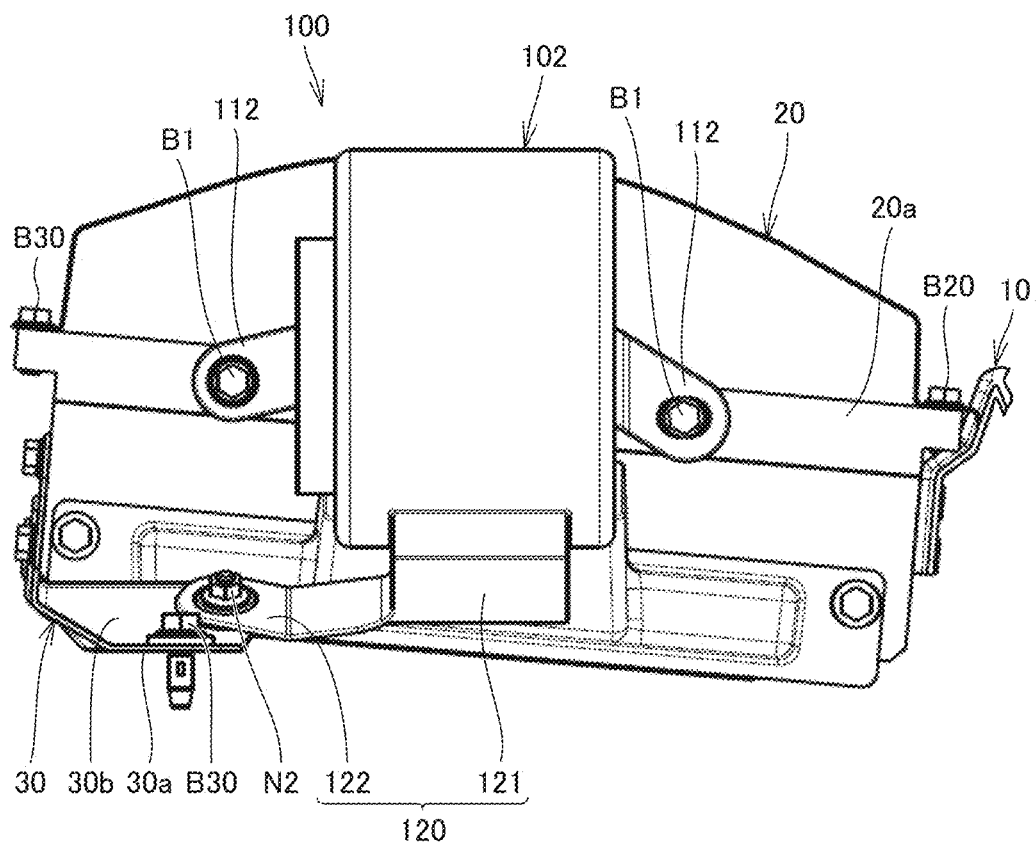
FIG. 2 is a side view illustrating the vehicle-mounted device-fixing structure.

The battery pack 20 is mounted to the housing 11 via a mounting bracket 30 for mounting the battery pack 20 to the housing 11. The mounting bracket 30 is made of metal. The mounting bracket 30 is fixed to the battery pack 20 by a fastening member. As illustrated in FIGS. 1 and 2, one end of the mounting bracket 30 is fixed to the housing 11 by a bolt B20, and the other end of the mounting bracket 30 is fixed to the housing 11 by a bolt B30.

As illustrated in FIG. 1, the vehicle-mounted device fixing structure 100 includes a vehicle-mounted device 102, a first bracket 110, a second bracket 120, and a collar 130.

The vehicle-mounted device 102 is mounted on the vehicle. In the present embodiment, the vehicle-mounted device 102 is a blower for cooling the battery pack 20. The vehicle-mounted device 102 is disposed between the side surface 20a of the battery pack 20 and the opposing wall 12.

Figure 3:
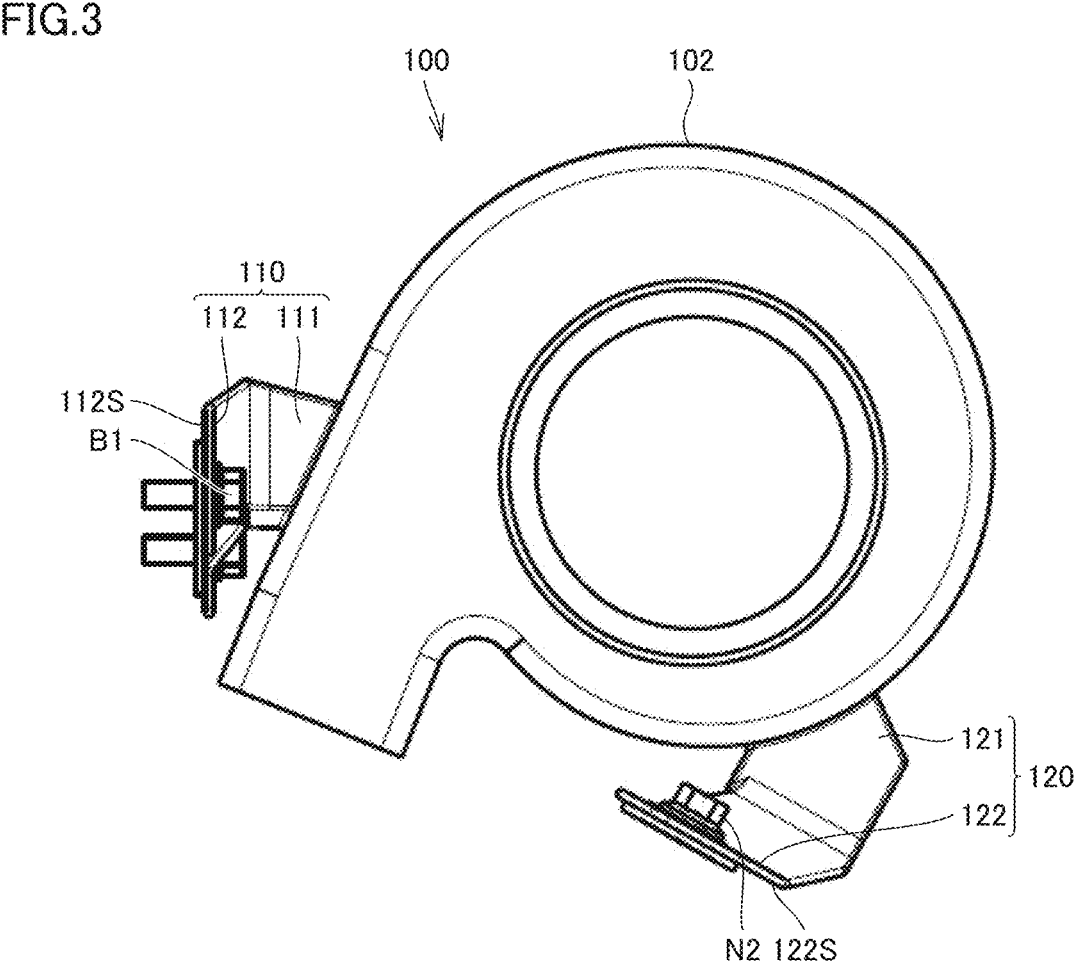
FIG. 3 is a front view illustrating the vehicle-mounted device-fixing structure.

The first bracket 110 is fixed to the vehicle-mounted device 102. As illustrated in FIGS. 1 and 3, the first bracket 110 includes a first base member 111 and at least one first fastening member 112. In the present embodiment, as illustrated in FIGS. 1 and 2, the at least one first fastening member 112 includes a pair of first fastening members 112.

The first base member 111 is fixed to an outer peripheral surface of the vehicle-mounted device 102.

The first fastening member 112 is fastened to a first fastening surface provided on the vehicle. In the present embodiment, the first fastening surface is formed by the side surface 20a of the battery pack 20. The first fastening member 112 includes a first contact surface 112S (see FIGS. 3 and 5) that contacts the first fastening surface. The first contact surface 112S is formed flat.

Figure 4:
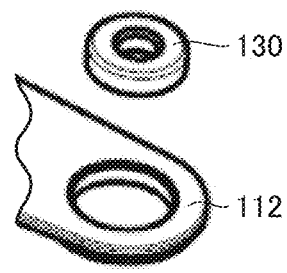
FIG. 4 is a perspective view schematically illustrating a first fastening member and a collar.
Figure 5:
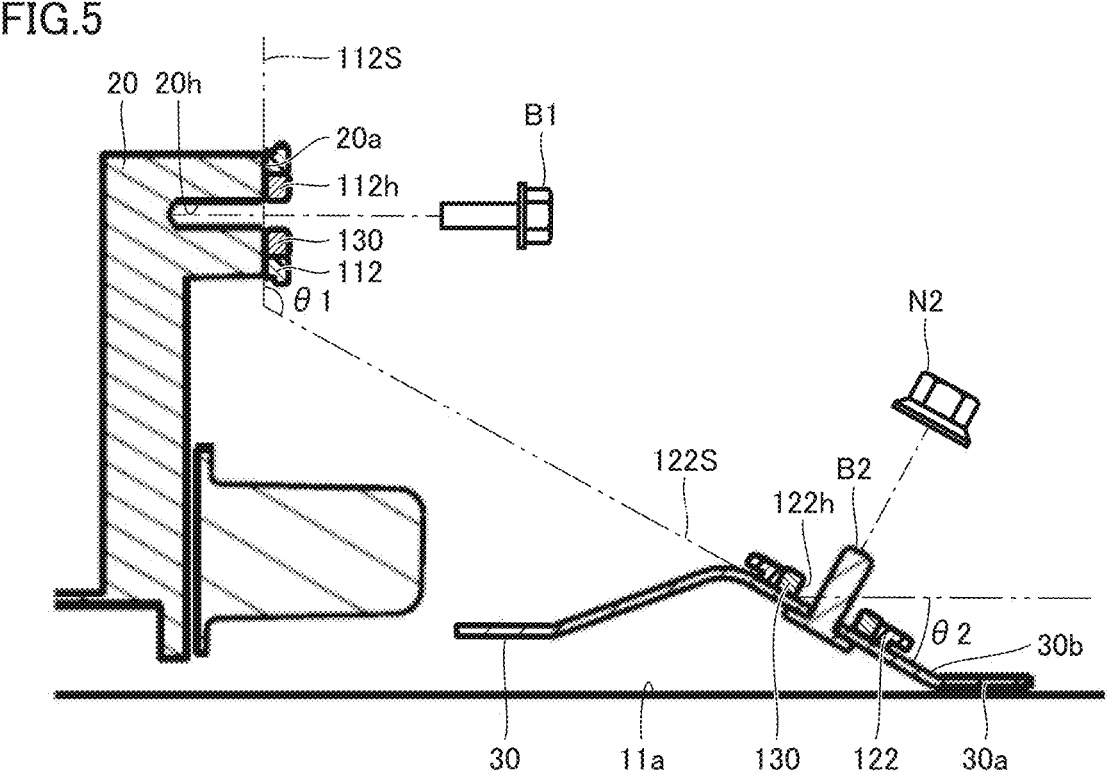
FIG. 5 is a cross-sectional view schematically illustrating a relationship between a first contact surface and a second contact surface.

As illustrated in FIG. 4, a collar 130 made of metal is fixed to the first fastening member 112. As illustrated in FIG. 5, the first fastening member 112 is fastened to the first fastening surface (the side surface 20a) by inserting a bolt B1 into a reference hole 112h provided on the collar 130 and a screw hole 20h provided on the battery pack 20.

The second bracket 120 is fixed to the vehicle-mounted device 102. As illustrated in FIGS. 1 to 3, the second bracket 120 includes a second base member 121 and a second fastening member 122.

The second base member 121 is fixed to the outer peripheral surface of the vehicle-mounted device 102. More specifically, the second base member 121 is fixed to a position on the outer peripheral surface of the vehicle-mounted device 102 which is separated from the position to which the first base member 111 is fixed.

The second fastening member 122 is shaped in such a manner that it extends from the second base member 121 in a direction intersecting a direction along which the side surface 20*a* of the battery pack 20 and the opposing wall 12 are joined to each other. The second fastening member 122 is fastened to a second fastening surface provided on the vehicle.

In the present embodiment, the second fastening surface is formed on the mounting bracket 30. Specifically, the mounting bracket 30 has a fixed surface 30*a* that is fixed to the housing 11 by the bolt B30 and an inclined surface 30*b* that is inclined with respect to the fixed surface 30*a*, and the second fastening surface is formed by the inclined surface 30*b*. A surface 11*a* of the housing 11 to which the fixed surface 30*a* is fixed is horizontal, for example.

As illustrated in FIG. 5, an angle θ2 formed between the second fastening surface (the inclined surface 30*b*) and the fixed surface 30*a* is an acute angle. The angle θ2 is set to be equal to or greater than an angle required for mounting the vehicle-mounted device 102 and equal to or less than a maximum bending angle in planar view.

The angle required for mounting the vehicle-mounted device 102 is set based on the molding of the vehicle-mounted device 102 and the following expression (1):

$$X \times \cos \theta 2 < \text{ideal dimension in planar view} \quad (1)$$

wherein X denotes a design tolerance in planar view required for assembling the vehicle-mounted device 102.

The maximum bending angle is set based on the molding requirements and a gap between the mounting bracket 30 and the peripheral components.

As illustrated in FIGS. 3 and 5, the second fastening member 122 includes a second contact surface 122S that contacts the second fastening surface. The second contact surface 122S is formed flat. As illustrated in FIG. 5, an angle θ1 formed between the first contact surface 112S and the second contact surface 122S is an obtuse angle. The second fastening member 122 is fastened to the second fastening surface by a bolt B2 that is welded to the inclined surface 30*b* and a bolt nut N2. As illustrated in FIG. 5, the collar 130 made of metal is fixed to the second fastening member 122, and the collar 130 is formed with a through hole 122*h* having such a size that allows the bolt B2 to be inserted through and is capable of absorbing tolerance. The second fastening member 122 may be fastened to the second fastening surface by a bolt that is not welded to the inclined surface 30*b* and a bolt nut.

As described above, according to the vehicle-mounted device-fixing structure according to the present embodiment, since the angle θ1 formed between the first contact surface 112S of the first fastening member 112 and the second contact surface 122S of the second fastening member 122 is an obtuse angle, it is possible to reduce the outer dimension of the structure including the vehicle-mounted device 102 and the brackets 110 and 120 in planar view.

It is understandable to those skilled in the art that the exemplary embodiment described above only serves as a specific example of the following aspects.

[Aspect 1]

A vehicle-mounted device-fixing structure including:
a vehicle-mounted device that is mounted on a vehicle;
a first bracket that is fixed to the vehicle-mounted device; and
a second bracket that is fixed to the vehicle-mounted device, wherein
the first bracket includes a first fastening member that is fastened to a first fastening surface provided on the vehicle,
the second bracket includes a second fastening member that is fastened to a second fastening surface provided on the vehicle,
the first fastening member includes a first contact surface that contacts the first fastening surface,
the second fastening member includes a second contact surface that contacts the second fastening surface, and
an angle formed between the first contact surface and the second contact surface is an obtuse angle.

According to the vehicle-mounted device-fixing structure, since the angle formed between the first contact surface of the first fastening member and the second contact surface of the second fastening member is an obtuse angle, it is possible to reduce the outer dimension of the structure including the vehicle-mounted device and each bracket in planar view.

[Aspect 2]

In the vehicle-mounted device-fixing structure according to aspect 1, the first fastening surface is formed by a side surface of a battery pack mounted on the vehicle, and the vehicle-mounted device is a blower for cooling the battery pack.

According to this aspect, it is possible to reduce the size of the structure including the battery pack and the vehicle-mounted device.

[Aspect 3]

In the vehicle-mounted device-fixing structure according to aspect 2, the vehicle includes a housing for housing the battery pack and the vehicle-mounted device, the housing has an opposing wall opposed to the side surface of the battery pack, the vehicle-mounted device is disposed between the side surface of the battery pack and the opposing wall, and the second bracket is shaped in such a manner that it extends from the vehicle-mounted device in a direction intersecting a direction along which the side surface of the battery pack and the opposing wall are joined to each other.

According to this aspect, it is possible to reduce the size of the housing and prevent the second bracket from interfering with the opposing wall.

[Aspect 4]

In the vehicle-mounted device-fixing structure according to aspect 3, the second fastening surface is formed on a mounting bracket for mounting the battery pack to the housing.

According to this aspect, it is unnecessary to provide a dedicated mounting member for mounting the vehicle-mounted device to the housing, and it is possible to adjust the second fastening surface by adjusting the mounting bracket.

[Aspect 5]

In the vehicle-mounted device-fixing structure according to aspect 4, the mounting bracket has a fixed surface that is fixed to the housing, and an angle formed between the second fastening surface and the fixed surface is an acute angle.

According to this aspect, it is possible to reduce the outer dimension of the vehicle-mounted device and the second bracket in planar view. Further, it is possible to reduce a moving amount of the second fastening member in planar view due to design tolerance. Therefore, it is possible to reduce the size of the fastening member for fastening the second fastening member to the second fastening surface.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A vehicle-mounted device-fixing structure comprising:
   a vehicle-mounted device that is mounted on a vehicle;
   a first bracket that is fixed to the vehicle-mounted device; and
   a second bracket that is fixed to the vehicle-mounted device, wherein
   the first bracket includes a first fastening member that is fastened to a first fastening surface provided on the vehicle,
   the second bracket includes a second fastening member that is fastened to a second fastening surface provided on the vehicle,
   the first fastening member includes a first contact surface that contacts the first fastening surface,
   the second fastening member includes a second contact surface that contacts the second fastening surface, and
   an angle formed between the first contact surface and the second contact surface is an obtuse angle;
   wherein the first fastening surface is formed by a side surface of a battery pack mounted on the vehicle, and
   the vehicle-mounted device is a blower for cooling the battery pack.

2. The vehicle-mounted device-fixing structure according to claim 1, wherein
   the vehicle includes a housing for housing the battery pack and the vehicle-mounted device,
   the housing has an opposing wall opposed to the side surface of the battery pack,
   the vehicle-mounted device is disposed between the side surface of the battery pack and the opposing wall, and
   the second bracket is shaped in such a manner that it extends from the vehicle-mounted device in a direction intersecting a direction along which the side surface of the battery pack and the opposing wall are joined to each other.

3. The vehicle-mounted device-fixing structure according to claim 2, wherein
   the second fastening surface is formed on a mounting bracket for mounting the battery pack to the housing.

4. The vehicle-mounted device-fixing structure according to claim 3, wherein
   the mounting bracket has a fixed surface that is fixed to the housing, and
   an angle formed between the second fastening surface and the fixed surface is an acute angle.

* * * * *